US008504912B2

(12) United States Patent
Giuffrida

(10) Patent No.: US 8,504,912 B2
(45) Date of Patent: Aug. 6, 2013

(54) SYSTEM TO FORECAST PERFORMANCE OF ONLINE NEWS ARTICLES TO SUGGEST THE OPTIMAL HOMEPAGE LAYOUT TO MAXIMIZE ARTICLE READERSHIP AND READERS STICKINESS

(75) Inventor: Giovanni Giuffrida, Catania (IT)

(73) Assignee: Neodata Group S.r.l., Varese (IT)

( * ) Notice: Subject to any disclaimer, the term of this patent is extended or adjusted under 35 U.S.C. 154(b) by 74 days.

(21) Appl. No.: 13/184,128

(22) Filed: Jul. 15, 2011

(65) Prior Publication Data

US 2013/0018697 A1 Jan. 17, 2013

(51) Int. Cl.
*G06F 17/27* (2006.01)

(52) U.S. Cl.
USPC ........... 715/243; 715/208; 715/234; 715/253; 715/273; 715/764; 715/774

(58) Field of Classification Search
USPC ................. 715/208, 234, 243, 253, 273, 764, 715/774
See application file for complete search history.

(56) References Cited

U.S. PATENT DOCUMENTS

| | | | | |
|---|---|---|---|---|
| 7,120,868 | B2 * | 10/2006 | Salesin et al. | 715/249 |
| 7,188,169 | B2 * | 3/2007 | Buus et al. | 709/224 |
| 7,299,457 | B2 * | 11/2007 | Marshall | 717/131 |
| 7,657,626 | B1 * | 2/2010 | Zwicky | 709/224 |
| 7,756,741 | B2 * | 7/2010 | Ranka et al. | 705/14.43 |
| 7,987,165 | B2 * | 7/2011 | Steele et al. | 707/702 |
| 8,166,155 | B1 * | 4/2012 | Rachmeler et al. | 709/224 |
| 2001/0020236 | A1 * | 9/2001 | Cannon | 707/1 |
| 2001/0050658 | A1 * | 12/2001 | Adams | 345/4 |
| 2002/0081033 | A1 * | 6/2002 | Stentiford | 382/218 |
| 2004/0059997 | A1 * | 3/2004 | Allen et al. | 715/501.1 |
| 2005/0071364 | A1 * | 3/2005 | Xie et al. | 707/102 |
| 2006/0085734 | A1 * | 4/2006 | Balnaves | 715/512 |
| 2006/0259859 | A1 * | 11/2006 | Ivarsoy et al. | 715/520 |
| 2007/0027768 | A1 * | 2/2007 | Collins et al. | 705/14 |
| 2007/0288843 | A1 * | 12/2007 | Makino | 715/520 |
| 2008/0046562 | A1 * | 2/2008 | Butler | 709/224 |
| 2008/0262913 | A1 * | 10/2008 | Reitz et al. | 705/14 |
| 2011/0072343 | A1 * | 3/2011 | Baciu et al. | 715/275 |

OTHER PUBLICATIONS

Gonzalez et al., Optimizing Web Newspaper Layout Using Simulated Annealing; 1999; International Work-Conference on Artificial and NaturalNeural Networks; IWANN; pp. 759-768.*
Douglas Crockford; JavaScript and HTML Script Tags; Mar. 5, 2006; www.crockford.com; pp. 1-2.*
Sengamedu et al.; Web Page Layout Optimization Using Section Importance; Apr. 25, 2008; pp. 1-8.*
Gonzalez et al.; Web Newspaper Layout Optimization Using Simulated Annealing; Oct. 2002; IEEE Transactions on Systems, Man, and Cybernetics—Part B; vol. 32, No. 5; pp. 686-691.*

(Continued)

*Primary Examiner* — Doug Hutton, Jr.
*Assistant Examiner* — Andrew Dyer
(74) *Attorney, Agent, or Firm* — Blakely, Sokoloff, Taylor & Zafman LLP

(57) ABSTRACT

A system that supports the editor of an journal web site into deciding the layout of the homepage of the journal web site; the homepage is divided into a set of zones, and each zone consists of several locations; articles are published into each location; and the system suggests ways to rearrange the articles published in the homepages into different locations within the same zone, in order to maximize the total number of clicks generated by the homepage of the journal web site.

14 Claims, 4 Drawing Sheets

OTHER PUBLICATIONS

R. H. Sprague, et al., "Building effective decision support systems," Prentice Hall, pgs. Table of Contents, Preface, 1-23, 279-296, 297, and 299-317 (1982).

D. J. Power, "Decision support systems: concepts and resources for managers," Quorum Books, pp. v-xiii, xv-xvi, 1-20, 103-121, and 123-139 (2002).

George M. Marakas, "Decision support systems in the 21st century," Prentice Hall, pp. iii, v-xxi, 1-34, and 353-482 (1999).

E. Turban, et al., "Information technology for management," Seventh Edition, John Wiley & Sons, pp. vii-xviii, 1-75, 196-240, and 445-484 (2010).

Clyde W. Holsapple, et al., "Decision support systems: A knowledge-based approach," Tenth Edition, West Group, pp. vii-xxxi, 1-2, and 129-274 (1996).

Donald Walker, "Similarity Determination and Case Retrieval in an Intelligent Decision Support System for Diabetes Management," A Thesis, pp. 1-109 (Nov. 2007).

* cited by examiner

Fig. 2
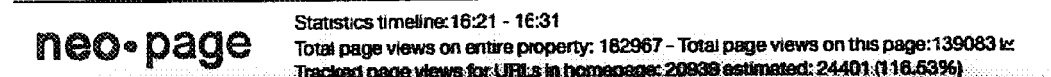
Fig. 3
1218 - ▼  11 - 📈  · 1h18m 1218 - △△  · -27% · 0.14% (2.2%)
Fig. 4

SYSTEM TO FORECAST PERFORMANCE OF ONLINE NEWS ARTICLES TO SUGGEST THE OPTIMAL HOMEPAGE LAYOUT TO MAXIMIZE ARTICLE READERSHIP AND READERS STICKINESS

FIELD

The present invention relates system to forecast performance of online news articles.

BACKGROUND OF THE INVENTION

A decision support system (DSS) is a computer-based information system that supports business or organizational decision-making activities. DSSs serve the management, operations, and planning levels of an organization and help to make decisions, which may be rapidly changing and not easily specified in advance.

DSSs include knowledge-based systems. A properly designed DSS is an interactive software-based system intended to help decision makers compile useful information from a combination of raw data, documents, personal knowledge, or business models to identify and solve problems and make decisions. Three fundamental components of a DSS architecture are;
 1. the database (or knowledge base);
 2. the model (i.e., the decision context and user criteria);
 3. the user interface.

DSS architectures are disclosed in the following publications:
 George. M. Marakas. Decision support systems in the 21st century. In Prentice Hall; US ed edition (Nov. 3, 1998), 1998.
 D. J. Power. Decision support systems: concepts and resources for managers. In Westport, Conn., Quorum Books, 2002.
 R. H. Sprague and E. D. Carlson. Building effective decision support systems. In Englewood Clis, N.J., Prentice-Hall. ISBN 0-130-86215-0, 1982.
 Haag Stephen, Cummings Maeve, and McCubbrey Donald. Management information systems: For the information age. In McGraw-Hill Companies, 2003.

The users themselves are also important components of the architecture.

There are several ways to classify DSS applications. Not every DSS fits neatly into one category, but may be a mix of two or more architectures.

Holsapple and Whinston (Clyde W. Holsapple and Andrew B. Whinston. Decision support systems: A knowledge-based approach. In West Group; 10th edition. ISBN 0-324 03578-0, 1996) classify DSS into the following six frameworks: Text-oriented DSS, Database-oriented DSS, Spreadsheet-oriented DSS, Solver-oriented DSS, Rule-oriented DSS, and Compound DSS.

A compound DSS is the most popular classification for a DSS. It is a hybrid system that includes two or more of the five basic structures described by Holsapple and Whinston.

The support given by DSS can be separated into three distinct, interrelated categories: Personal Support, Group Support, and Organizational Support (R. D. Hackathorn and P. G. W. Keen. Organizational strategies for personal computing in decision support systems. MIS Quarterly, 5(3), 1981).

DSS components may be classified as:
 1. Inputs: Factors, numbers, and characteristics to analyze;
 2. User Knowledge and Expertise: inputs requiring manual analysis by the user;
 3. Outputs: Transformed data from which DSS "decisions" are generated;
 4. Decisions: Results generated by the DSS based on user criteria.

DSSs which perform selected cognitive decision-making functions and are based on artificial intelligence or intelligent agents technologies are called Intelligent Decision Support Systems (IDSS). Flexible manufacturing systems (FMS) (Felix Chang, Bong Jiang, and Nelson Tang. The development of intelligent decision support tools to aid the design of flexible manufacturing systems. International Journal of Production Economics, 65:73-84, 2000) and medical diagnosis systems (D. Walker. Similarity determination and case retrieval in an intelligent decision support system for diabetes management. In MSc Thesis, Ohio University, Computer Science—Engineering, 2007) can also be considered examples of intelligent decision support systems. Many IDSS implementations are based on expert systems, a well established type of KBS that encode the cognitive behaviours of human experts using predicate logic rules and have been shown to perform better than the original human experts in some circumstances (J. Baron. Thinking and deciding. In Cambridge University Press. 1998/E. Turban E., L. Volonio L., E. McLean, and J. Wetherbe. Information technology for management. In Wiley, 2009).

SUMMARY OF THE INVENTION

The object of the present invention is to provide a system to forecast performance of online news articles, which is based on a decision support system (DSS) and helps the editorial work of determining the layout of the home page of online journals.

The system of the present invention allows monitoring in real-time the popularity of articles published in the home page and maximizing both the number of total articles read and the stickiness of readers to the site.

The system of the present invention supports the editorial work providing analytic data and forecasts on the performance of the articles. According to both the performance history of every single publishing zone in the home page and the number of clicks received by every article's link, the system of the present invention provides suggestions supporting the editor in deciding the layout of the home page of the online journal, namely:
 1. which links to keep in the home page,
 2. which links to remove from the home page,
 3. how to reorder the links in the home page from one location to another.

The system of the present invention provides a web interface with real time information on the performance of each article published in the home page.

The system of the present invention also tracks historical information on the performance of articles in the "article timeline".

BRIEF DESCRIPTION OF THE DRAWINGS

The invention will now be described with particular reference to the accompanying drawings of a preferred non limiting embodiment thereof in which:

FIG. 2 shows an enriched web interface of the system of FIG. 1;

FIG. 3 shows a top bar of the system of FIG. 1;

FIG. 4 shows a link ticker of the system of FIG. 1;

DETAILED DESCRIPTION OF THE INVENTION

Figure 1:
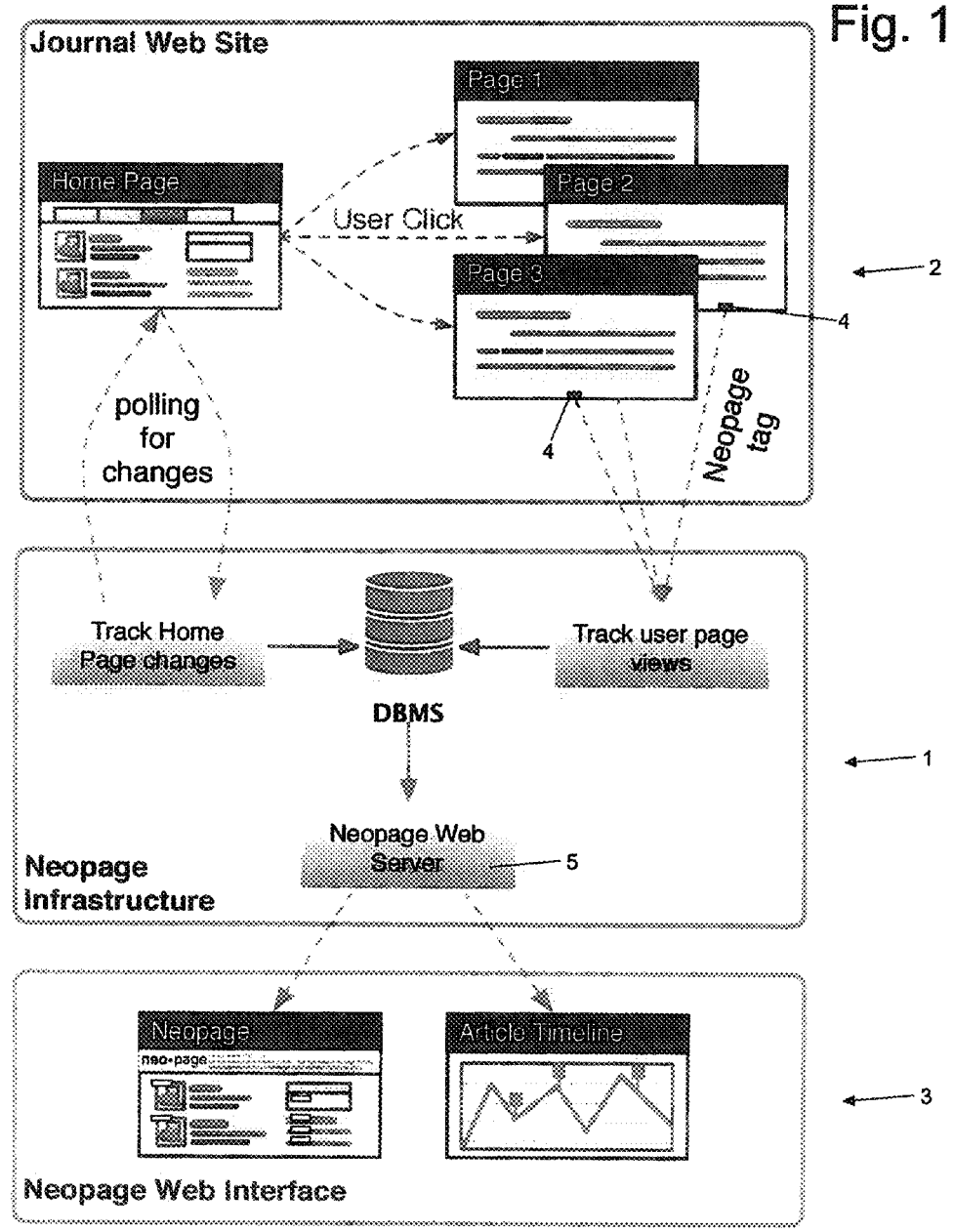
FIG. 1 shows the architecture of the system to forecast performance of news articles of the present invention.

In FIG. 1, numeral 1 indicates as a whole a system (called "Neopage") to forecast performance of news articles of a journal web site 2 (i.e. an online journal). The system is based on a decision support system (DSS) and comprised a web interface 3 to allow the user of the system 1 to interact with the system 1.

The only requirement for the journal web site 2 is to place a tag 4 inside all the internal webpages that need to be tracked. This tag 4 has the following form: <script type="text/javascript" src=" . . . "></script>.

When an online user views a webpage tracked by the tag 4, the browser of the online users calls a web server 5 of the system 1. This mechanism allows the system 1 to keep the necessary statistics, as shown in FIG. 1.

The system 1 requires two phases in order to adapt itself to the structure of the journal web site 2:
1. after two weeks following the insertion of the tags 4, the journal web site 2 receives a user name and a password for logging in the web interface 3. This allows the editor of the journal web site 2 to get acquainted with the web interface 3. This period is required to set up the system 1 and to adapt the system 1 to the anatomy of the home page of the journal web site 2.
2. the system 1 needs an additional time period of two to three weeks in order to learn how every location performs. The length of this period depends on two factors: the number of impressions and how often an article is moved to a different location only after this period the suggestions will be shown.

Web Interfaces

The system 1 provides the editor of a journal web site 2 with two primary tools to monitor the performance of the articles: an enriched web interface (shown in Figure and the article timeline (shown in FIG. 2) that is an interface with detailed statistical data for each article.

Web Interfaces: The Enriched Web Interface

The enriched web interface shows an augmented version of the home page of the journal web site 2, in which data on the performance and suggestions are shown next to every tagged link. FIG. 2 shows a snapshot of an enriched web interface.

Over the home page of the journal web site 2 a top bar (shown in FIG. 3) appears with general information. Moreover, a small box called "link ticker" (shown in FIG. 4) appears on the home page of the journal web site 2 for each tagged link.

The top bar (shown in FIG. 3) provides the following information, where x is a configurable parameter:
a) Statistics timeline: the time interval used for the extraction of data, which corresponds to the last x minutes.
b) Total page views on entire property: total number of impressions generated by the entire journal web site 2 in the last x minutes.
c) Tracked page views for URLs in home page: total number of impressions generated by the articles published in the home page during the last x minutes;
d) Estimated page views in the home page according to system suggestions: forecasted number of impressions which would be generated during the next x minutes if the suggestions provided by the system 1 are followed.

Note that the number of impressions provided refers only to those generated by the pages containing the tag 4. Impressions generated by articles not having any tag 4 are not counted.

Each link in the home page is associated to a green ticker, reporting nine types of data analyzed during the last x minutes. These data are, in order:
a) Total number of impressions generated by the article linked;
b) An optimal position indicator suggesting how many positions to move the link (upwards arrow or downwards arrow);
c) A graph symbol which, if clicked, allows the user to view the article time-line;
d) The lifetime of the article in hours within the homepage;
e) The forecast number of impressions that the article may generate if the suggestions provided by the system 1 are followed.
f) The performance of an article location with respect to the historical performance of the locations in which the article is placed. The degree of the performance may be one of the following five objects: two up-arrows, one up-arrow, an equal sign, one down-arrow, and two down-arrows meaning, respectively, that the article location is doing very good, good, equal, bad, or very bad with respect to the historical performances of the location it lies.
g) A number which shows whether the article has a bad performance with respect to the performance of the impressions of the whole online newspaper for that time slot. If the number is negative than the number of page views of the article within the last observed time frame are much lower than those of the overall web site. Else, it shows how much (in terms of page views percentage) the article is being visited with respect to the web site.
h) A number which shows the click through rate (CTR) of the underlying article defined as the ratio between the number of the article impressions of the last m minutes and the number of home page impressions of the last m minutes, where m is a system parameter defined by the editor of the newspaper.
i) A number showing the average click through rate (CTR) of the underlying location defined as the ratio between the number of the location impressions of the last m minutes and the number of home page impressions of the last m minutes, where m is a system parameter defined by the editor of the newspaper.

In particular, as far as the item "g" is concerned, the system 1 checks the trend of the impressions generated by each tagged article, and sends an alert by email if the impressions of an article have a bad performance with respect to the performance of the impressions of the whole online newspaper. More in detail, let a be an article, and let h be an hour of the day, where h is a number between 0 and 23. Denote with imps(a,h) the number of impressions generated by article a during hour h. Denote with imps(h) the number of impressions generated by the whole online newspaper during hour h.

For each hour h<23, we compute:

$$x_{a,h} = \frac{imps(a, h+1) - imps(a, h)}{imps(a, h)}$$

$$y_{a,h} = \frac{imps(h+1) - imps(h)}{imps(h)}$$

If $(x_{a,h} - y_{a,h} < p)$ for a fixed parameter p, then an alert is sent by email, warning that article a, during hour h, has had a bad trend.

Web Interfaces: The Article Timeline

Figure 5:
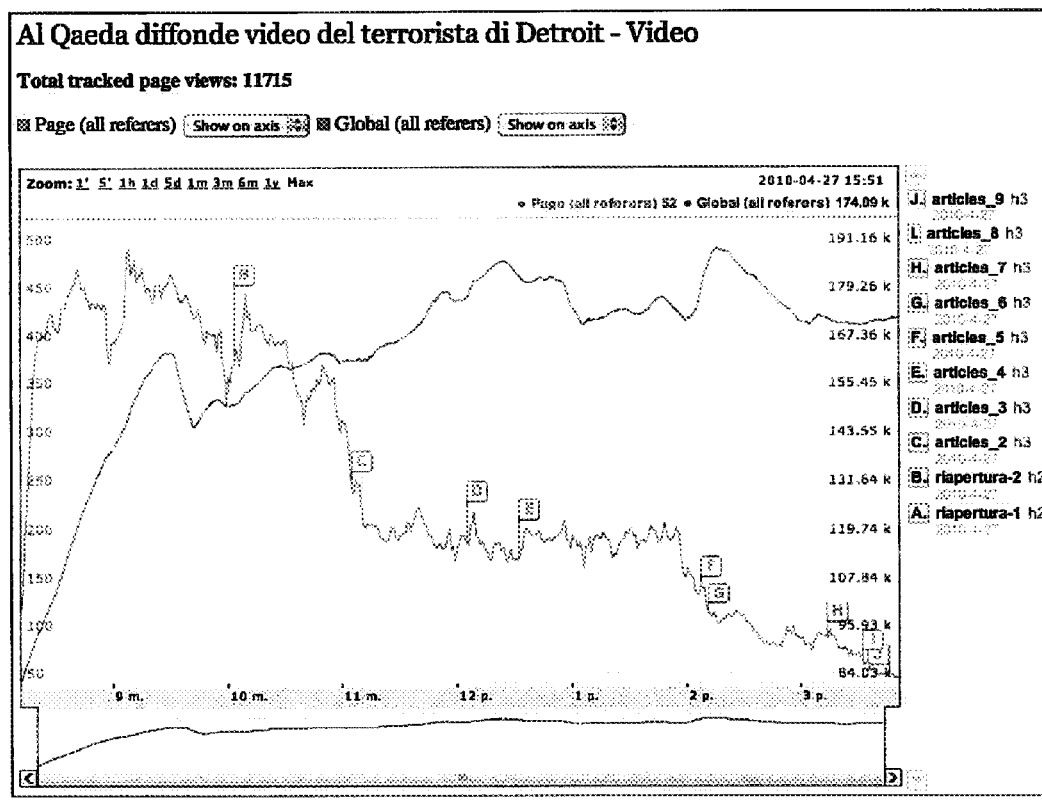
FIG. 5 shows an article timeline generated by the system of FIG. 1.

The article timeline shows the article's performance during its lifetime. In the graph shown in FIG. 5, the blue line indicates the number of impressions generated by the article, while the red line indicates the number of impressions generated by all the articles tracked by the tags 4.

The letters on the blue line indicate the movements of the article from one location to another.

Figure 6:
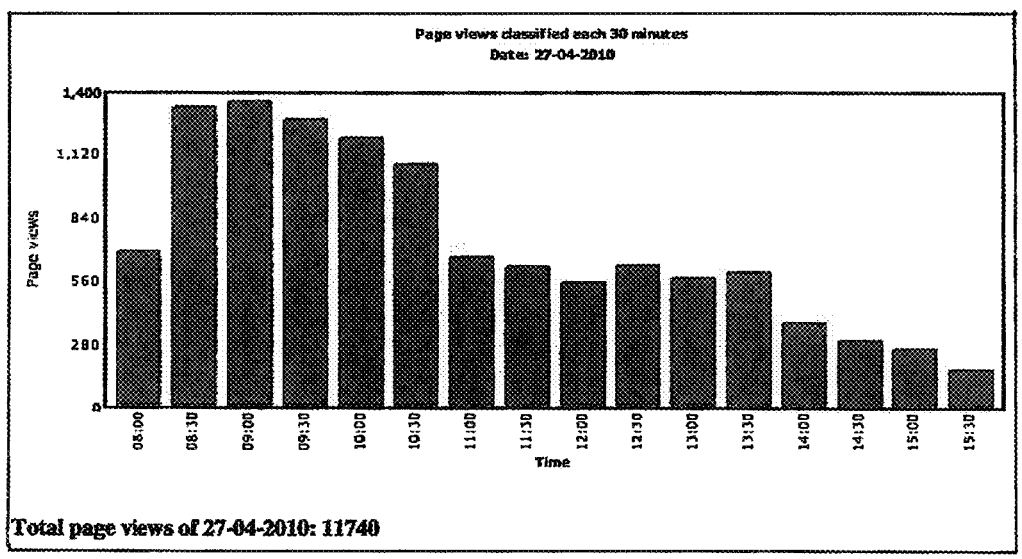
FIG. 6 shows a number of impressions of an article in blocks of 30 minutes generated by the system of FIG. 1.

The bar chart shown in FIG. 6 indicates the number of impressions generated by the article in blocks of 30 minutes.

Architecture

FIG. 1 shows the architecture of the system 1. The journal web site 2 consists of a home-page that links to several internal webpages. The system 1 tracks the content of the homepage, by polling it every minute. The journal's home page is an HTML file which is then parsed by the system 1. By doing so, the system 1 can detect whether new articles have been inserted, old ones have been deleted or moved to a different location (within the same zone).

Furthermore, the system 1 tracks the user clicks to the internal webpages by means of a tag 4 placed in the HTML source code of the internal webpages of the journal web site 2. The system 1 stores the tracked information in a DBMS for elaboration, and the elaborated information is then used by the web server 5 to generate the suggestions for the editor.

Architecture: Anatomy of the Homepage

The home page of the journal web site 2 is divided into a set of zones. Each zone consists of different locations. A location is a rectangular area that contains a link to an article of the journal web site 2. One of the locations of each zone is designated as the reference location of the zone.

The locations in the same zone are related to each other by a similar topic or media type. For example a zone can correspond to a section of the home page of the journal. The system 1 only optimizes locations within the same zone. This is not a limitation of the algorithm since articles in different zones are not supposed to be switched, e.g. an article in the politics section will never appear in the sport section. The task of dividing the home page into zones is therefore a very straightforward one and is taken care of by the system 1 unless differently requested.

Architecture: Suggestions

The system 1 suggests to the editor a way of rearranging the articles published in the homepage in order to maximize the number of clicks. For instance, suppose the homepage contains a zone with three locations $l_1$, $l_2$, and $l_3$. Assume that each location $l_i$ contains a link to an article $a_i$. The system 1 may suggest the editor to swap the articles $a_1$ and $a_2$, that is, to move article $a_1$ to location $l_2$, and article $a_2$ to location $l_1$, whereas article $a_3$ remains in location $l_3$. Along with these suggestions, the system 1 gives also an estimate of the number of clicks that the homepage is expected to receive in the next x minutes if the suggestions are followed, where x is a configurable parameter.

The suggestions made by the system 1 are always rearrangements of articles within the same zone.

We now describe how these suggestions are computed.

Algorithm: Moving Scores

In the following x is a configurable parameter denoting a fixed number of minutes.

For each pair of distinct locations l,k of the same zone, the system 1 computes a moving score m(l,k) which estimates the effect obtained on the number of generated clicks by moving an article from location l to location, k.

For instance, if m(l,k)=1.1, and in the last x minutes the article in location l received 1,000 clicks, then the system 1 estimates that by moving the article from location l to location k, in the next x minutes it will receive 1,100 clicks.

To compute the moving scores, the system 1 analyzes, over a sufficiently long learning time frame, the effect of moving articles between locations. More precisely, whenever an article a is moved from location l to location k, the following numbers are collected: the number of clicks c(a; l) generated by the article a in location l during the x minutes before the move; the number of clicks c' (a; k) generated by the article a in location k during the x minutes after the move; the number d of clicks generated by the whole homepage during the x minutes before the move; and the number d' of clicks generated by the whole homepage during the x minutes after the move. These four numbers are used to compute the value $(c(a,k)c'(a,l))\times(d'/d)$, and the moving score m(l,k) is obtained by averaging all these values, as they are obtained from the learning time frame.

Algorithm: Performance Scores

The system 1 assigns to each location 1 a performance score s(l), which measures the power of the location to generate clicks.

Informally, the performance score s(l) of a location 1 is given by the number of clicks received by the location over a sufficiently long learning time frame, and normalized so that the performance score of each reference location is always 1.

The performance scores are computed based on the moving scores learned over the learning time frame.

More formally, let $l_1 \ldots l_n$ be the locations of a given zone, and let $l_1$ be the reference location of the zone. Then $s(l_1)=1$ and $s(l_i)=s(l_{i-1})\times m(l_{i-1}, l_i)$, for $i>1$.

Algorithm; Computation of the Suggestions

Assume that a zone contains the location $l_1 \ldots l_n$. Assume that, at some instant of time, location $l_1$ contains a link to article $a_i$, for each i=1 ... n. The system 1 can then suggest to the editor a different rearrangement of the articles to the locations, in order to maximize the number of clicks generated by the homepage.

To compute the suggestions, the system 1 proceeds as follows.

For each location l containing a link to an article a, let c(a,l) be the number of clicks generated by the article a in location l during the last x minutes. Also, let s(l) be the performance score of location l. Then, the system 1 computes the potential score p(a) of article a as the ratio of c(a,l) to s(l).

Once the potential scores are computed, the system 1 orders all articles published in the zone in decreasing order of potential score. Moreover, the system 1 orders all locations of the zone in decreasing order of performance score. The system 1 then suggests to place the article with the highest potential score in the location with the highest performance score, the article with the second highest potential score in the location with the second highest performance score, and so on.

Algorithm: Potential Effect of the Suggestions

Once the suggestions are computed, the system 1 estimates the number of clicks that may be received by the homepage if the suggestions are followed.

Assume that an article a is published in a location 1, but the system 1 suggests to move it to location k. Let c(a,l) be the number of clicks generated by article a in location l during the last x minutes.

Then, the system 1 estimates the number of clicks c'(a,k) that article a may receive in the next x minutes if it is moved to location k. This is done by using the moving score m(l,k), that is, the system 1 estimates that c'(a,k) is equal to the product of c(a,l) by m(l,k).

CONCLUSION

The system 1 supports the editor of a journal web site 2 into deciding the layout of the homepage.

The homepage of the journal web site 2 consists of a set of zone, and each zone consists of a set of locations. A location is a rectangular area that contains a link to an article.

The system 1 suggests a way to rearrange the positioning of articles within different locations in a given zone of the homepage. The algorithm used to compute the suggestions works by computing, over a sufficiently long timeframe, appropriate performance scores for each locations, as well as moving scores that measure the effect of moving an article from a given location to another in the same zone.

Along with the suggestions, the system 1 also computes their effect, that is, the total number of clicks that the homepage is expected to receive if the suggestions are followed.

What is claimed is:

1. A computer-based system to forecast performance of news articles published in a journal web site comprising a home-page that links to one or more internal webpages, the system comprising:
    a computer-based web server for receiving tracking information from a tag which is placed inside the one or more internal webpages of the journal web site;
    a computer-based database management system including a storage unit for storing the
        received tracking information, wherein the computer-based web server is configured to:
        generate suggestions based on the stored tracking information; and
        present the suggestions to an editor of the journal web site by updating a web interface that is maintained by the computer-based web server, the web interface including an enriched web interface showing an augmented version of the home page of the journal web site, in which data on performance and suggestions are shown next to every tagged link, and
        an article timeline containing detailed statistical data for each article,
        wherein the enriched web interface comprises a top bar providing the following information:
            a) statistics timeline, which represents a time interval used for extraction of data, the time interval corresponding to a last x minutes,
            b) total page views on entire property, which corresponds to a total number of impressions generated by the entire journal web site in the last x minutes,
            c) tracked page views for uniform resource locators (URLs) in home page, which correspond to a total number of impressions generated by the articles published in the home page during the last x minutes;
            d) estimated page views in the home page according to system suggestions, which corresponds to a forecasted number of impressions which would be generated during a next x minutes if the suggestions provided by the system are followed, wherein x is a configurable parameter; and wherein in the enriched web interface each link in the home page is associated to a ticker, reporting the following data analyzed during the last x minutes:
            e) total number of impressions generated by the article linked;
            f) an optimal position indicator suggesting how many positions to move the link;
            a) a graph symbol which, if clicked, allows the user to view the article time-line;
            b) a lifetime of the article in hours within the homepage;
            c) a forecast number of impressions that the article may generate if the suggestions provided by the system are followed,
            d) a performance of an article location with respect to the historical performance of the locations in which the article is placed,
            e) a number which shows whether the article has a bad performance with respect to the performance of the impressions of the whole online newspaper for that time slot,
            f) a number which shows the click through rate of the underlying article,
            g) a number showing the average click through rate of the underlying location.

2. The computer-based system according to claim 1, wherein the tag has the following form: <script type="text/javascript" src=" . . . "></script>.

3. The computer-based system according to claim 1, wherein the computer-based web server is further configured to:
    check a trend of impressions generated by each tagged article; and
    send an alert by email based on a comparison of the number of impressions of an article and the number of impressions of the whole journal web site.

4. The system according to claim 3, wherein:
    the computer-based web server is further configured to:
    for each hour h from 0 to 23, send an alert by email warning that article a had a bad trend during hour h, if ($x_{a,h}$ minus $y_{a,h}$) is less than a fixed parameter, wherein
    $x_{a,h}$ is computed by determining a first result by subtracting a number of impressions generated by article a during hour h from a number of impressions generated by article a during hour (h+1), and dividing the first result by the number of impressions generated by article a during hour h, and
    $y_{a,h}$ is computed by determining a second result by subtracting a number of impressions generated by the journal web site during hour h from a number of impressions generated by the journal web site during hour (h+1), and dividing the second result by the number of impressions generated by the journal web site during hour h.

5. The system according to claim 1, wherein the article timeline shows the article's performance during its lifetime and indicates the number of impressions generated by the article, and the number of impressions generated by all the articles tracked by the tags.

6. The system according to claim 1, wherein:
    the home page of the journal web site is divided into a set of zones, each of which consists of different locations that are rectangular areas, each location contains a link to an article of the journal web site;

the locations are grouped into the same zone based on their topic and media type; and the system only optimizes locations within the same zone.

7. The system according to claim 1, wherein the computer-based web server suggests to the editor a way of rearranging the articles published in the homepage in order to maximize a number of clicks and gives an estimate of the number of clicks that the homepage is expected to receive in the next x minutes if the suggestions are followed.

8. The system according to claim 7, wherein:

the home page of the journal web site is divided into a set of zones, each of which consists of different locations that are rectangular areas, each location contains a link to an article of the journal web site;

the locations are grouped into the same zone based on their topic and media type and the suggestions made by the system are always rearrangements of articles within the same zone.

9. The system according to claim 8, wherein for each pair of distinct locations l,k of the same zone, the computer-based web server computes a moving score m(l,k) which estimates the effect obtained on the number of generated clicks by moving an article from location l to location k.

10. The system according to claim 9, wherein whenever an article a is moved from location l to location k, the following numbers are collected:

a number of clicks c(a; l) generated by the article a in location l during the x minutes before the move;

a number of clicks c'(a; k) generated by the article is in location k during the minutes after the move;

a number d of clicks generated by the whole homepage during the x minutes before the move; and a number d' of clicks generated by the whole homepage during the x minutes after the move;

wherein these four numbers are used to compute a value (c(a,k)=c'(a,l))×(d'/d), and the moving score m(l,k) is obtained by averaging all these values.

11. The system according to claim 8, wherein the computer-based web server assigns to each location l a performance score s(l), which measures a power of a location to generate clicks and is given by a number of clicks received by the location over a learning time frame between two to three weeks, and normalized so that the performance score of each reference location is always 1.

12. The system according to claim 11, wherein:

the computer-based web server is configured to:

for each location l containing a link to an article a, determining a first value corresponding to a number of clicks generated by the article a in location l during the last x minutes;

determining a performance score of location l; and determining a potential score of the article a by dividing the first value by the performance score of location 1;

order all articles published in the zone in decreasing order of potential score;

order all locations of the zone in decreasing order of performance score; and suggest the placement of the articles in the locations based on the order of the articles and the order of the locations, such that the article with the highest potential score is placed in the location with the highest performance score, and the article with the second highest potential score is placed in the location with the second highest performance score.

13. The system according to claim 12, wherein, once the suggestions are computed, the computer-based web server estimates a number of clicks that may be received by the homepage if the suggestions are followed.

14. The system according to claim 13, wherein:

the computer-based web server is further configured to:

determine a number of clicks generated by an article a in location l during the last x minutes; and estimate a number of clicks that the article a may receive in the next x minutes if it is moved to location k by multiplying the number of clicks generated the article a in location l during the last x minutes with a moving score.

\* \* \* \* \*